Oct. 11, 1932.  E. W. RAWDON  1,881,947
FISH LURE
Filed May 20, 1931
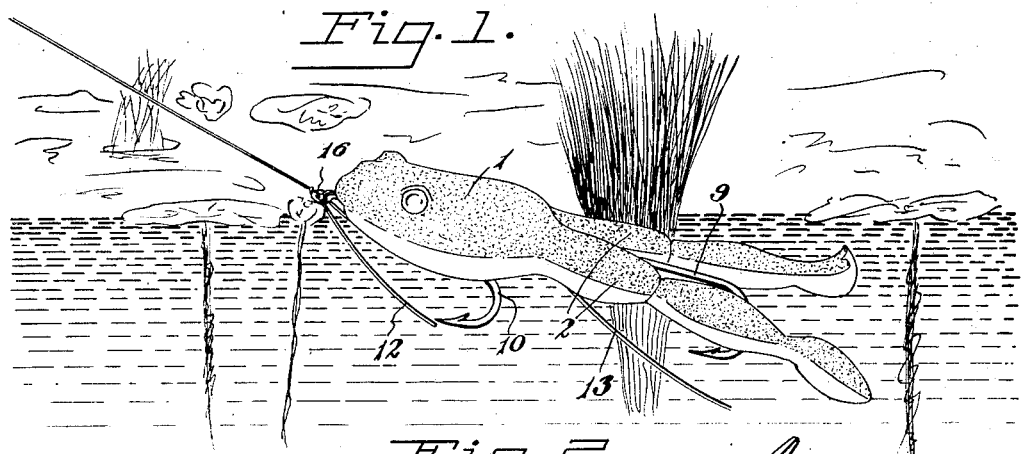
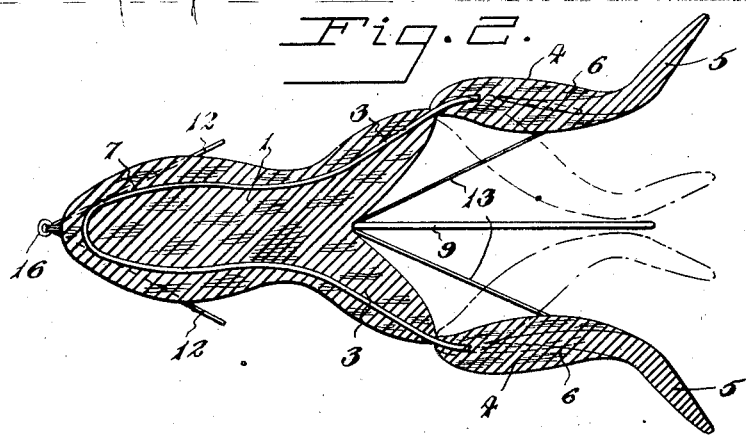
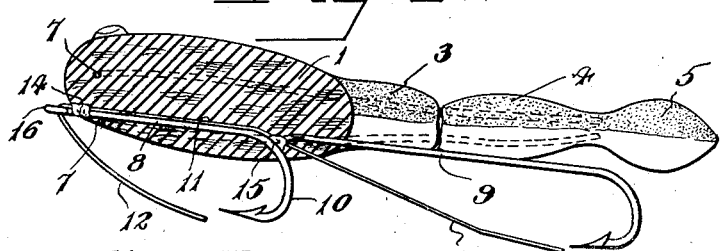
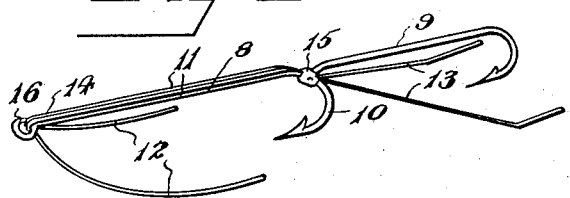
Inventor
E. W. Rawdon
By Lacey & Lacey, Attorneys Patented Oct. 11, 1932

1,881,947

UNITED STATES PATENT OFFICE

EDWARD W. RAWDON, OF AKRON, OHIO

FISH LURE

Application filed May 20, 1931. Serial No. 538,797.

This invention relates to fishing and trapping and more particularly to a lure intended for use as an artificial bait when fishing for game fish. In the present embodiment of the invention, the lure has been shown in the form of a frog which closely resembles a live frog, and one object of the invention is to provide a frog with legs so constructed that when it is cast into the water and advanced forwardly by successive jerks upon a line and allowed to come to a stop between movements, the legs will have transverse movements imparted to them by the action of the water and thereby cause the legs to have movements closely resembling those of a live frog when swimming.

Another object of the invention is to provide an artificial bait which is formed of a composition of rubber and pulverized cork having strands embedded in it which serve not only to reinforce the bait, but also constitute means for pivotally connecting upper and lower leg portions and permitting the lower leg portions to have transverse movement when the bait is in use.

Another object of the invention is to provide the legs with feet which may be formed of tougher material such as pure rubber instead of a mixture of rubber and cork and provide these feet with extensions serving to firmly retain the feet in connection with the lower leg portions.

Another object of the invention is to provide an improved arrangement of hooks which are so associated with the body portion of the frog that they will retain the frog in its proper position when floating in the water.

Another object of the invention is to provide the hooks with improved guards serving to prevent weeds from catching upon the bills and prongs of the hooks.

The invention is illustrated in the accompanying drawing wherein:

Figure 1 is a perspective view showing the improved artificial bait in use.

Figure 2 is a longitudinal sectional view through the bait.

Figure 3 is a sectional view taken longitudinally through the bait in a vertical direction, and Figure 4 is a perspective view of the hooks and weed guards.

The improved bait has been shown in the form of a frog having a body 1 and legs 2. Each leg has an upper portion 3 which is formed integral with the body 1 and a lower portion 4 intended to have movement transversely relative to the upper leg portion and terminating at its rear end in a foot 5 which projects outwardly as shown in Figure 2.

The body and the upper and lower leg portions are preferably formed from a mixture of rubber and pulverized cork consisting preferably of ninety percent pulverized cork and ten percent rubber, whereas the feet are pure rubber.

The feet are formed of cured rubber and each has a shank 6 of such length that when these feet are placed in a mould and the mixture of rubber and cork poured into the mould to form the body and legs the shanks of the feet will extend longitudinally in the lower leg portions a sufficient distance to cause them to be entirely surrounded by the mixture of cork and rubber and firmly hold the feet and lower leg portions in engagement with each other.

Strands of cord or other flexible material 7 which serve as reinforcements extend longitudinally in the body and through the upper and lower leg portions. These strands are disposed one above the other as shown in Figure 3. It should be noted that in order to form the upper and lower leg portions, each leg is appreciably reduced in thickness intermediate its length. Therefore the frog's legs will have the proper shape and in addition the legs may be swung transversely at the reduced portions with the cords serving as hinges to pivotally connect the lower leg portions with the upper leg portions.

The hooks 8 and 9 extend longitudinally of the bait with the front hook 8 embedded in the body 1. This hook has its bill 10 extending downwardly so that it projects from the body as shown in Figures 1 and 3 and the hook 9 projects rearwardly from the hook 8 and extends from the body between the legs 2. It should be noted that the hooks are so disposed with respect to the body that they not only serve their usual purpose as hooks, but also act as counterweights to retain the frog in its proper position shown in Figure 1 when floating in water. It is desired to prevent weeds and grass from catching upon the hooks when the bait is drawn forwardly through the water, and in order to do so there has been provided strands of thin wire 11 which extend longitudinally of the hook 8 and have their end portions 12 and 13 extending rearwardly from front and rear end portions of the body at a downward incline. These portions 12 and 13 diverge rearwardly as shown clearly in Figures 2 and 4 and terminate at opposite sides of the bills of the hooks. Therefore when the bait is drawn forwardly through water, any grass or weeds will be deflected by the guards 12 and 13 and prevented from catching upon the hooks.

The strands 11 are secured to the hook 8 by solder as shown at 14 and 15 in order to firmly secure them in place and the solder 15 also serves to retain the shank of the hook 9 in firm engagement with the hook 8. It will be understood that when forming a small frog, the rear hook may be omitted in which case the strands which form the weed guards will only be long enough to form the front guards.

When this bait is in use, a fishing line will be tied in the eye 16 at the front of the hook 8 and the line may be cast in the usual manner. When the frog strikes the water, the weight of the hooks will cause it to assume its proper position as shown in Figure 1 and it will float with its head and a portion of its body projecting from the water and its legs beneath the water. The line is drawn forwardly by short jerks so timed that the frog will be progressively moved forwardly and allowed to come to a rest between its forward movements. The legs normally extend in diverging relation to each other as shown in full lines in Figure 2, but as the frog is drawn forwardly, the water by acting against the outturned feet will cause the lower leg portions to be moved toward each other until they contact as indicated by dotted lines in this figure. When the frog comes to a stop the legs will return to their normal positions. Therefore by progressively moving the frog forwardly its legs will have motions similar to those employed by a frog when swimming and the frog will have a very natural appearance as it moves through the water.

Before the bait is first used, the lower leg portions should be swung outwardly and forwardly to crack the rubber at the reduced portions separating the upper and lower leg portions, thereby permitting the lower leg portions to move easily transversely of the upper leg portions when the bait is in use. It will be understood that the bait will be suitably painted so that it has the natural colors of a frog and will preferably have its upper portions green and its lower portions white. A glossy paint may be used or the frog first painted and then varnished. While the bait has been described as a frog, it will be understood that it could be moulded in any form desired.

What is claimed is:

1. An artificial bait comprising a body having rearwardly extending legs terminating in feet, cords extending longitudinally in said legs, the legs being reduced in thickness intermediate their ends whereby rear portions of the legs may be swung transversely with the cords serving as means to pivotally connect the front and rear portions of the legs, and a hook carried by the body.

2. An artificial bait comprising a body having rearwardly extending legs reduced in thickness intermediate their ends and terminating at their rear ends in feet extending outwardly, flexible reinforcing elements extending longitudinally in said legs with portions extending through the reduced portions of the legs and constituting hinges whereby rear portions of the legs may be moved towards each other by the action of water against the feet when the bait is moved forwardly and return to their normal positions when the bait comes to a stop, and a hook carried by the body.

3. An artificial bait comprising a body having leg extensions terminating in outturned feet and reduced intermediate their ends to form upper and lower leg portions, cords embedded in the body and legs and extending longitudinally through the legs in spaced relation to each other, portions of the cords extending through the reduced portions of the legs serving to retain the upper and lower leg portions in operative relation to each other and permit the lower leg portions to be moved towards each other by action of water against the feet as the bait is drawn forwardly through water and return to their normal positions when the bait comes to a stop thereby imitating motions of a swimming frog and a hook carried by the body.

4. An artificial bait comprising a body having leg extensions reduced intermediate their ends to form upper and lower leg portions, the body and legs being moulded of intermingled cork and rubber, feet at the ends of said legs formed of stiffer rubber than the legs and having shanks embedded in the lower leg portions, cords extending longitudinally in the body and through the legs with the shanks of the feet extending between the cords, portions of the cords extending through the reduced portions of the legs serving to retain the upper and lower leg portions in operative relation to each other and permit the lower leg portions to be moved towards each other by action of water against the feet as the bait is drawn forwardly through water and return to their normal positions when the bait comes to a stop thereby imitating motions of a swimming frog, and a hook carried by the body.

5. In an artificial bait, a body moulded of bouyant material having rearwardly extending legs provided with reduced portions terminating in feet, cords embedded in the body with portions thereof extending through the reduced portions of the legs and serving to pivotally connect said body and legs whereby the legs may have movements imparted thereto when the bait is drawn through water to simulate motions of a live bait, and a hook carried by said body.

6. In an artificial bait, a body moulded of bouyant material having leg extensions reduced in thickness intermediate their ends to form upper and lower leg portions and having feet at their ends, cords in said body extending through the legs to reinforce the same and pivotally connect the upper and lower leg portions whereby the lower leg portions may have movement to simulate motions of a swimming frog, a hook having its shank embedded in said body and its bill extending downwardly and serving as a counterweight to retain the bait in a natural position when the bait is in water, and wires carried by said hook and extending rearwardly at opposite sides of the bill to serve as weed guards.

7. In an artificial bait, a body moulded of bouyant material and having leg extensions reduced in thickness intermediate their ends to form upper and lower leg portions and having feet at their ends, cords in said body extending through the legs to reinforce the same and pivotally connect the upper and lower leg portions whereby the lower leg portions may have movement to simulate motions of a swimming frog, a hook having its shank embedded in said body and its bill extending downwardly and serve as a counterweight to retain the bait in a natural position when the bait is in water, and a second hook secured to the shank of the first hook and projecting rearwardly from the body between the legs with its bill extending downwardly and wires extending longitudinally of the shank of the first hook with their end portions extending rearwardly at opposite sides of the bill to serve as weed guards.

8. In an artificial bait, a body having leg extensions reduced intermediate their ends to form rigid upper leg portions and movable normally separated lower leg portions, flexible reinforcing elements embedded in the leg extensions at the reduced portions thereof and serving to pivotally connect the same whereby the lower leg portions may be moved towards each other by the action of the water when the bait is drawn forwardly, and a hook carried by the body portion.

9. In an artificial bait, a body having leg extensions reduced intermediate their ends to form upper and lower leg portions, the lower leg portions being normally separated and terminating in laterally extending feet, flexible reinforcing elements embedded in the leg extensions at the reduced portions thereof and serving to pivotally connect the same whereby said lower leg portions may be moved towards each other by the action of the water when the bait is drawn forwardly, and a hook carried by the body portion.

10. An artificial bait comprising a buoyant body portion, normally separated leg extensions having their inner ends reduced and their outer ends provided with laterally extending feet, flexible reinforcing elements embedded in the body portion and the reduced portions of the leg extensions and forming a pivotal connection between said leg extensions and the body portion whereby the legs may be moved towards each other by the action of the water when the bait is drawn forwardly, and a hook carried by said body portion.

In testimony whereof I affix my signature.
EDWARD W. RAWDON. [L. S.]